(12) United States Patent
Ho et al.

(10) Patent No.: US 7,369,355 B2
(45) Date of Patent: May 6, 2008

(54) MAGNETIC DISK DRIVE APPARATUS AND MANUFACTURING METHOD OF MAGNETIC DISK DRIVE APPARATUS

(75) Inventors: Yiu Sing Ho, Kwai Chung, N. T. (HK); Takehiro Kamigama, Kwai Chung, N. T. (HK); Masashi Shiraishi, Kwai Chung, N. T. (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 343 days.

(21) Appl. No.: 10/997,941

(22) Filed: Nov. 29, 2004

(65) Prior Publication Data
US 2005/0117248 A1 Jun. 2, 2005

(30) Foreign Application Priority Data
Dec. 1, 2003 (JP) .............................. 2003-401192

(51) Int. Cl.
*G11B 17/00* (2006.01)
*G11B 5/48* (2006.01)

(52) U.S. Cl. .................................. 360/97.01; 360/264.1

(58) Field of Classification Search ............. 360/234.5, 360/246.2, 254.6, 264.7, 97.01, 266.1, 264.4, 360/264.1, 264, 264.3, 265.6, 274, 246.7
See application file for complete search history.

(56) References Cited

U.S. PATENT DOCUMENTS 4,359,762 A * 11/1982 Stollorz ................... 360/98.07
5,761,007 A * 6/1998 Price et al. ............... 360/264.4
5,872,688 A * 2/1999 Battu et al. ............... 360/264.7
5,983,485 A * 11/1999 Misso ....................... 29/603.03

(Continued)

FOREIGN PATENT DOCUMENTS

JP 6-215513 8/1994

OTHER PUBLICATIONS

U.S. Appl. No. 10/986,097, filed Nov. 12, 2004, Ho et al.

(Continued)

*Primary Examiner*—Brian E. Miller
*Assistant Examiner*—Matthew G. Kayrish
(74) *Attorney, Agent, or Firm*—Oblon, Spivak, McClelland, Maier & Neustadt, P.C.

(57) ABSTRACT

A magnetic disk drive apparatus includes a housing member with first and second faces opposed to each other, at least part of each of the first and second faces being opened, a first cover member for covering the first face of the housing member, a second cover member for covering the second face of the housing member, a first HGA including a first magnetic head slider and a first suspension for supporting the first magnetic head slider, a second HGA including a second magnetic head slider and a second suspension for supporting the second magnetic head slider, a first support arm for supporting the first HGA, a second support arm for supporting the second HGA, a magnetic disk with both surfaces to which the first and second magnetic head sliders are opposed, respectively, and a motor for rotating the magnetic disk. The magnetic disk and the motor are attached to the housing member, the first support arm is attached to the first cover member, and the second support arm is attached to the second cover member.

9 Claims, 11 Drawing Sheets

U.S. PATENT DOCUMENTS

| | | | |
|---|---|---|---|
| 6,469,864 B2* | 10/2002 | Kamezawa et al. | 360/97.01 |
| 6,560,075 B2* | 5/2003 | Price et al. | 360/264.3 |
| 7,031,115 B1* | 4/2006 | Gilovich | 360/264.4 |
| 2002/0012198 A1* | 1/2002 | Rancour et al. | 360/234.5 |
| 2002/0149884 A1* | 10/2002 | Price et al. | 360/265.2 |

OTHER PUBLICATIONS

U.S. Appl. No. 10/987,154, filed Nov. 15, 2004, Ho et al.
U.S. Appl. No. 10/979,185, filed Nov. 3, 2004, Ho et al.
U.S. Appl. No. 10/997,941, filed Nov. 29, 2004, Ho et al.

* cited by examiner

MAGNETIC DISK DRIVE APPARATUS AND MANUFACTURING METHOD OF MAGNETIC DISK DRIVE APPARATUS

PRIORITY CLAIM

This application claims priority from Japanese patent application No.2003-401192, filed on Dec. 1, 2003, which is incorporated herein by reference.

BACKGROUND OF THE INVENTION

1. Field of the Invention

The present invention relates to a magnetic disk drive apparatus and to a manufacturing method of a magnetic head drive apparatus.

2. Description of the Related Art

In a magnetic disk drive apparatus or a hard disk drive (HDD) apparatus, a thin-film magnetic head element for writing magnetic information into and/or reading magnetic information from a magnetic disk or a hard disk is in general formed on a magnetic head slider flying in operation above the rotating magnetic disk. The slider is supported at top end section of a suspension of a head gimbal assembly (HGA).

The HDD apparatus has in general a housing member with an opened top face and a cover member for covering the top face to accommodate inside at least one magnetic disk, a drive motor for rotating the disk, an HGA with a magnetic head slider, a suspension and a lead conductor member, a support arm for supporting the HGA, and an actuator such as a voice coil motor (VCM) for swinging the support arm in a plane parallel to the magnetic disk.

In the conventional HDD apparatus, as disclosed in Japanese patent publication No.06-215513 A2, these main components such as the magnetic disk, the drive motor, the HGA, the support arm and the VCM are attached to the housing member, but are not attached to the cover member. The cover member is used only for covering the opening of the housing member to seal the HDD apparatus.

In such the conventional HDD apparatus, both the magnetic disk with a recording surface that should be kept free of contamination and the HGA are attached to the housing member side. Therefore, when the HGA has to be replaced due to malfunctions after assembling in the HDD apparatus, it is necessary to pay close attention to prevention of the contamination of the magnetic disk surface.

In the conventional manufacturing process of the HDD apparatus, in general, first the magnetic head slider is attached to the suspension to form an HGA that has a proper size for a worker to easily handle, and then the HGA is assembled in the HDD apparatus by the worker. Thus, a thin-film magnetic head element formed on the slider is sometimes destroyed by electrostatic discharge (ESD). Thus, in case that the thin-film magnetic head element of the slider is a magnetoresistive effect (MR) element, particularly, a giant magnetoresistive effect (GMR) element or a tunneling magnetoresistive effect (TMR) element, it must give special consideration to the prevention of possible ESD destruction.

BRIEF SUMMARY OF THE INVENTION

It is therefore an object of the present invention to provide a magnetic disk drive apparatus and a manufacturing method of a magnetic head drive apparatus, whereby, after assembling an HGA and a magnetic disk in the magnetic disk drive apparatus, the HGA can be easily replaced without inducing contamination of the magnetic disk.

Another object of the present invention is to provide a manufacturing method of a magnetic head drive apparatus, whereby ESD destruction of a magnetic head slider can be effectively prevented.

According to the present invention, a magnetic disk drive apparatus includes a housing member with first and second faces opposed to each other, at least part of each of the first and second faces being opened, a first cover member for covering the first face of the housing member, a second cover member for covering the second face of the housing member, a first HGA including a first magnetic head slider and a first suspension for supporting the first magnetic head slider, a second HGA including a second magnetic head slider and a second suspension for supporting the second magnetic head slider, a first support arm for supporting the first HGA, a second support arm for supporting the second HGA, a magnetic disk with both surfaces to which the first and second magnetic head sliders are opposed, respectively, and a motor for rotating the magnetic disk. The magnetic disk and the motor are attached to the housing member, the first support arm is attached to the first cover member, and the second support arm is attached to the second cover member.

Because the first support arm with the first HGA having the first magnetic head slider and the first suspension is attached to the first cover member and the second support arm with the second HGA having the second magnetic head slider and the second suspension is attached to the second cover member, whereas the magnetic disk and the motor are attached to the housing member, it is possible to assemble the first and second HGAs in isolation from the housing member provided with the magnetic disk of which surface has to keep clean. Thus, flexibility of tools or devices used for assembling the first and second HGAs can be increased and also assembling themselves can be performed with a high degree of efficiency. Furthermore, when replacing each HGA already assembled in the HDD apparatus, the replacement work can be performed by detaching only each cover member from the HDD apparatus, namely by treating only the each cover member in isolation from the housing member, no contamination of the disk surface can be induced and also the replacement can be effectively executed.

It is preferred that the apparatus further includes an actuator for rotatively moving the first and second support arms in parallel with the surfaces of the magnetic disk, and a part of the actuator is attached to the housing member.

It is preferred that the remaining part of the actuator is attached to one of the first and second cover members.

It is also preferred that the first HGA further includes a first wiring member supported by or formed on the first suspension and electrically connected with the first magnetic head slider. In this case, preferably, the first magnetic head slider is electrically connected with the first wiring member by solder ball bonding (SBB). Similarly, it is preferred that the second HGA further includes a second wiring member supported by or formed on the second suspension and electrically connected with the second magnetic head slider. In this case, preferably, the second magnetic head slider is electrically connected with the second wiring member by SBB. By using SBB for the electrical connection of the slider, no clamping tool utilized in the ultrasonic gold ball bonding (GBB) process is necessary. Therefore, it is possible to mount each magnetic head slider even after the assembling of each HGA.

It is also preferred that the first and second magnetic head sliders are fixed to the first and second suspensions by SBB, respectively. Because the mechanical fixing of each magnetic head slider to each suspension is performed by SBB, the resin-feeding process and the resin-curing process that are necessary when resin adhesive is used for fixing can be omitted resulting the manufacturing process to simplify. Furthermore, if it is necessary to detach each magnetic head slider from each HGA, since the mechanical fixing is executed by SBB, the slider and the suspension can be extremely easily separated from each other by heating the solder balls and by sucking and removing thus molten solder in a vacuum.

It is preferred that the first magnetic head slider is fixed to the first suspension by SBB at an element formed surface and/or at least one surface other than the element formed surface of the first magnetic head slider, and that the second magnetic head slider is fixed to the second suspension by SBB at an element formed surface and/or at least one surface other than the element formed surface of the second magnetic head slider.

According to the present invention, also, a manufacturing method of a magnetic disk drive apparatus, includes a step of attaching a magnetic disk and a motor for rotating the magnetic disk, to a housing member with first and second faces opposed to each other, at least part of each of the first and second faces being opened, a step of attaching a first support arm for supporting a first HGA to a first cover member, and also a second support arm for supporting a second HGA to a second cover member, and a step of thereafter fixing the first and second cover members to the housing member so as to cover the first and second faces of the housing member, respectively.

Because the magnetic disk and the motor is preliminarily attached to the housing member whereas the first and second support arms for supporting the first and second HGAs are preliminarily attached to the first and second cover members, respectively, it is possible to assemble the first and second HGAs in isolation from the housing member provided with the magnetic disk of which surface has to keep clean. Thus, flexibility of tools or devices used for assembling the HGAs can be increased and also assembling themselves can be performed with a high degree of efficiency. Furthermore, when replacing each HGA already assembled in the HDD apparatus, the replacement work can be performed by detaching only each cover member from the HDD apparatus, namely by treating only each cover member in isolation from the housing member, no contamination of the disk surface can be induced and also the replacement can be effectively executed.

It is preferred that the step of attaching the first and second support arms includes attaching a first support arm for supporting a first HGA with no magnetic head slider to the first cover member, attaching a second support arm for supporting a second HGA with no magnetic head slider to the second cover member, and thereafter mounting first and second magnetic head sliders on the first and second head gimbal assemblies, respectively, just before the first and second cover members are fixed to the housing member. Because each HGA with no magnetic head slider that is easily destructed by ESD is first attached to each cover member and then each magnetic head slider is mounted on this HGA just before each cover member is fixed to the housing member, ESD destruction of each magnetic head slider can be effectively suppressed.

It is also preferred that the method further includes a step of attaching at least a part of an actuator for rotatively moving the first and second support arms in a parallel direction with the surfaces of the magnetic disk, in addition to the magnetic disk and the motor, to the housing member.

It is further preferred that the method further includes a step of attaching the remaining part of the actuator to one of the first and second cover members.

It is preferred that the mounting of the first and second magnetic head sliders on the first and second head gimbal assemblies includes fixings of the first and second magnetic head sliders to first and second suspensions of the first and second head gimbal assemblies, respectively, and electrical connections of the first and second magnetic head sliders to first and second wiring members supported by or formed on the first and second suspensions, respectively.

It is preferred that the electrical connections of the first and second magnetic head sliders to the first and second wiring members are performed by SBB. By using SBB for the electrical connection of the slider, no clamping tool utilized in the ultrasonic GBB process is necessary. Therefore, it is possible to mount each magnetic head slider even after the assembling of each HGA.

It is also preferred that the fixings of the first and second magnetic head sliders to the first and second suspensions are performed by SBB. Because the mechanical fixing of each magnetic head slider to each suspension is performed by SBB, the resin-feeding process and the resin-curing process that are necessary when resin adhesive is used for fixing can be omitted resulting the manufacturing process to simplify. Furthermore, if it is necessary to detach each magnetic head slider from each HGA, since the mechanical fixing is executed by SBB, the slider and the suspension can be extremely easily separated from each other by heating the solder balls and by sucking and removing thus molten solder in a vacuum.

It is further preferred that the fixing of the first magnetic head slider to the first suspension is performed by SBB at an element formed surface and/or at least one surface other than the element formed surface of the first magnetic head slider, and that the fixing of the second magnetic head slider to the second suspension is performed by SBB at an element formed surface and/or at least one surface other than the element formed surface of the second magnetic head slider.

Further objects and advantages of the present invention will be apparent from the following description of the preferred embodiments of the invention as illustrated in the accompanying drawings.

DETAILED DESCRIPTION OF THE INVENTION

Figure 1:
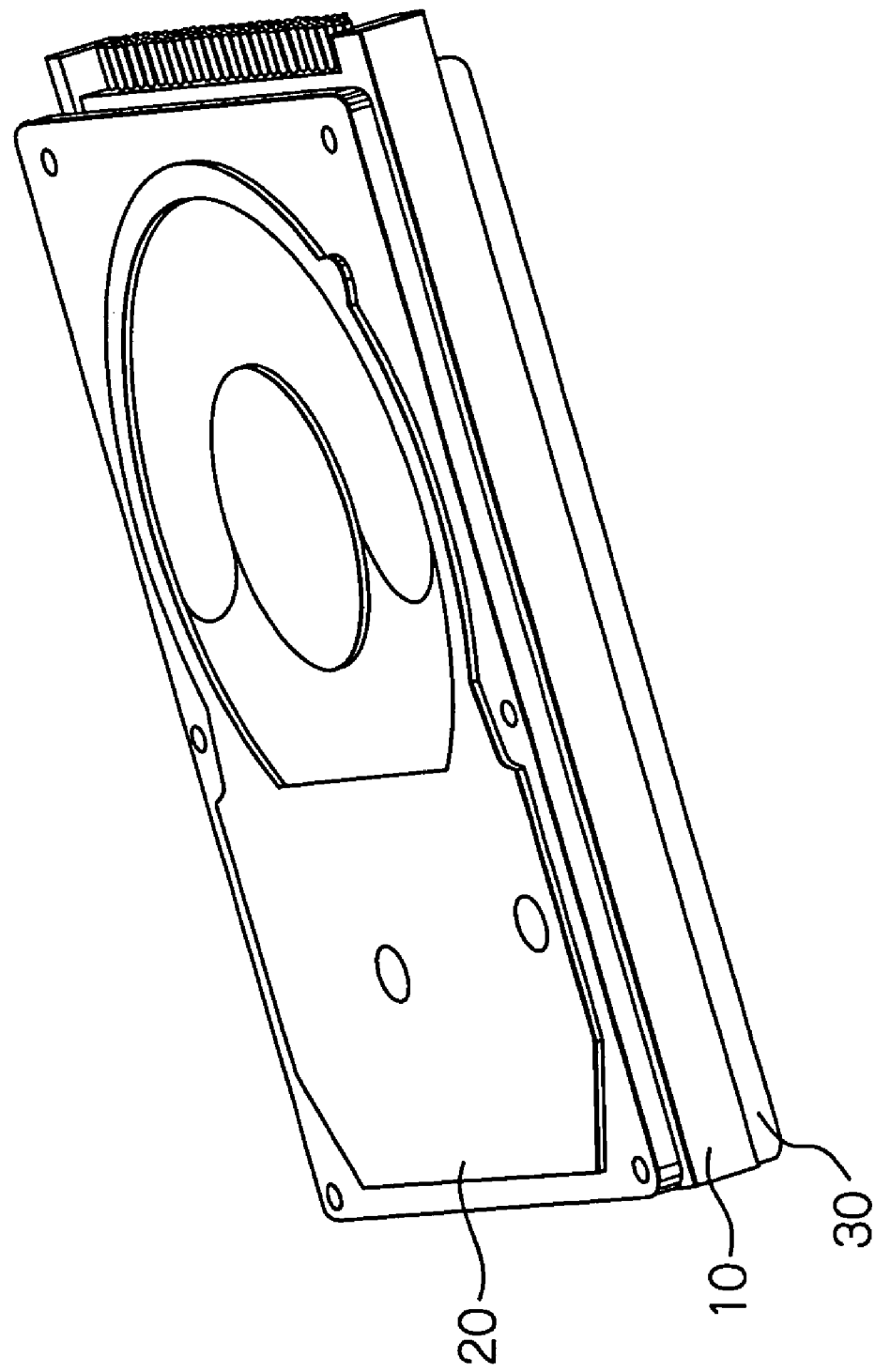
FIG. 1 shows an oblique view schematically illustrating appearance of an HDD apparatus as a preferred embodiment according to the present invention.
Figure 2:
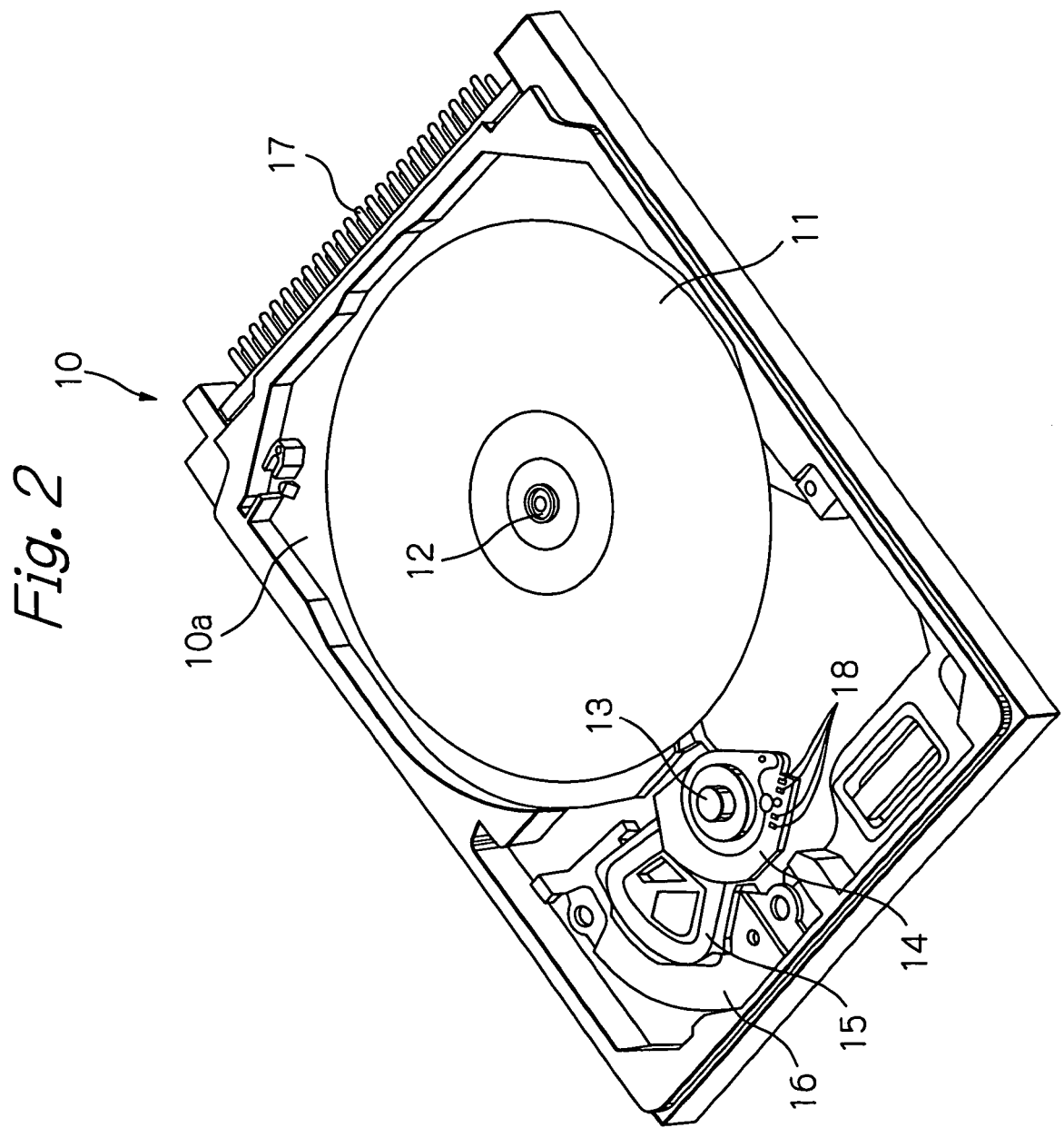
FIG. 2 shows an oblique view schematically illustrating configuration of a housing member of the HDD apparatus in this embodiment.
Figure 3A:
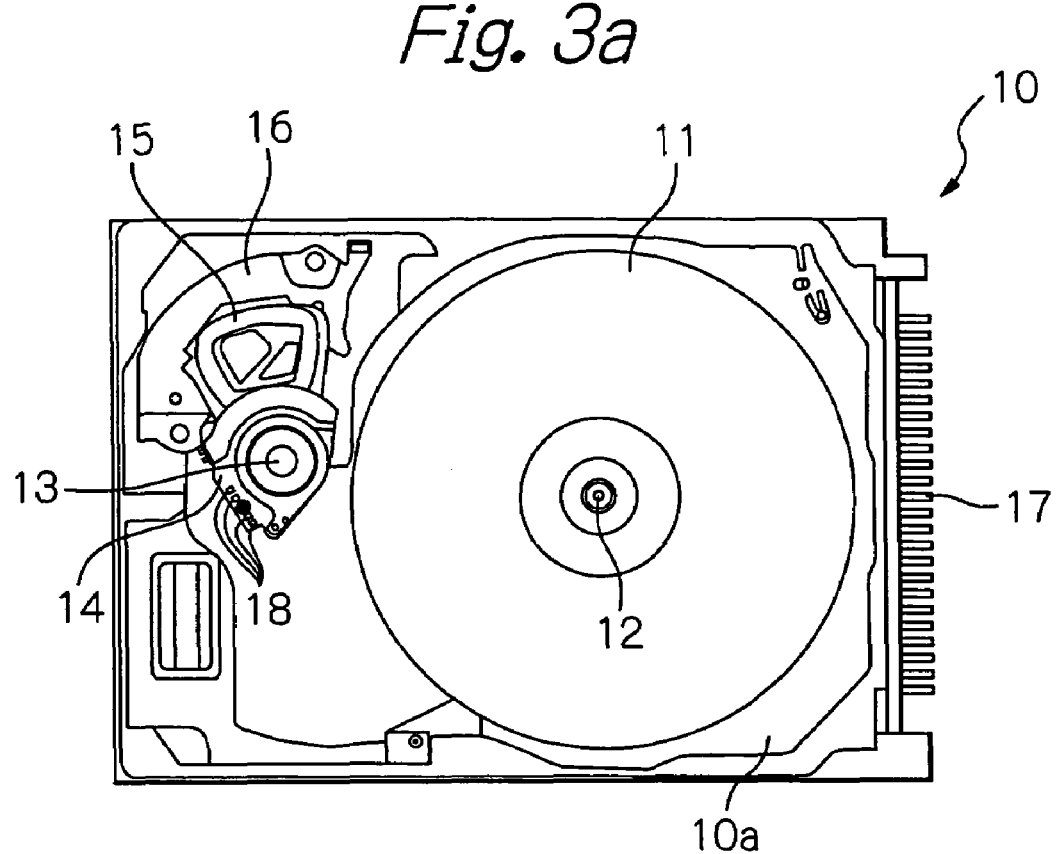
FIGS. 3a and 3b show a plane view and a rear view of the housing member of FIG. 2.
Figure 3B:
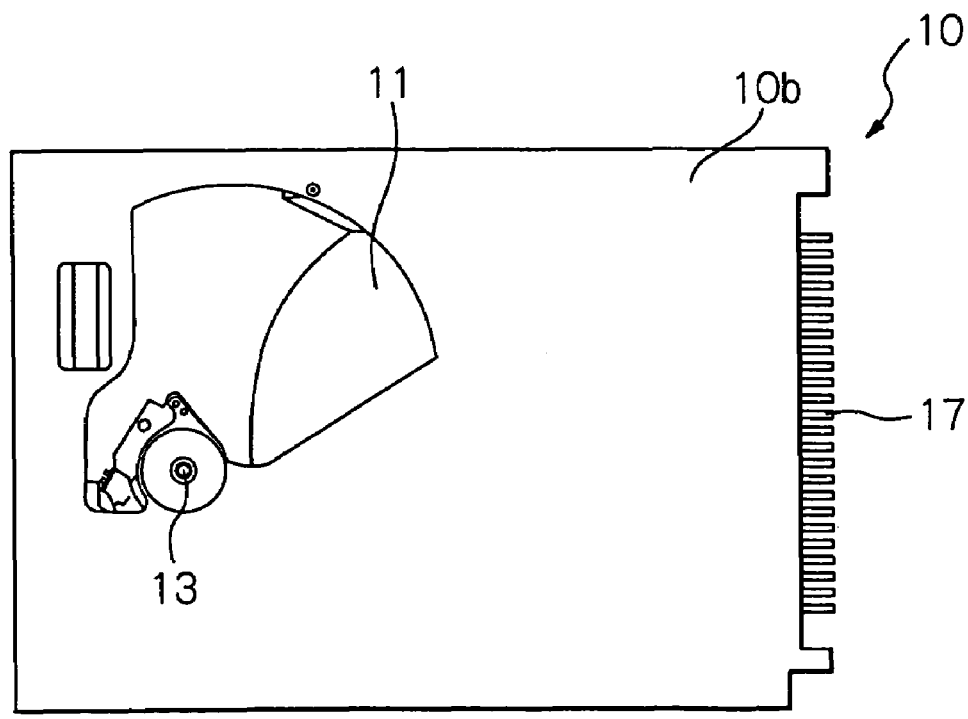
Figure 4:
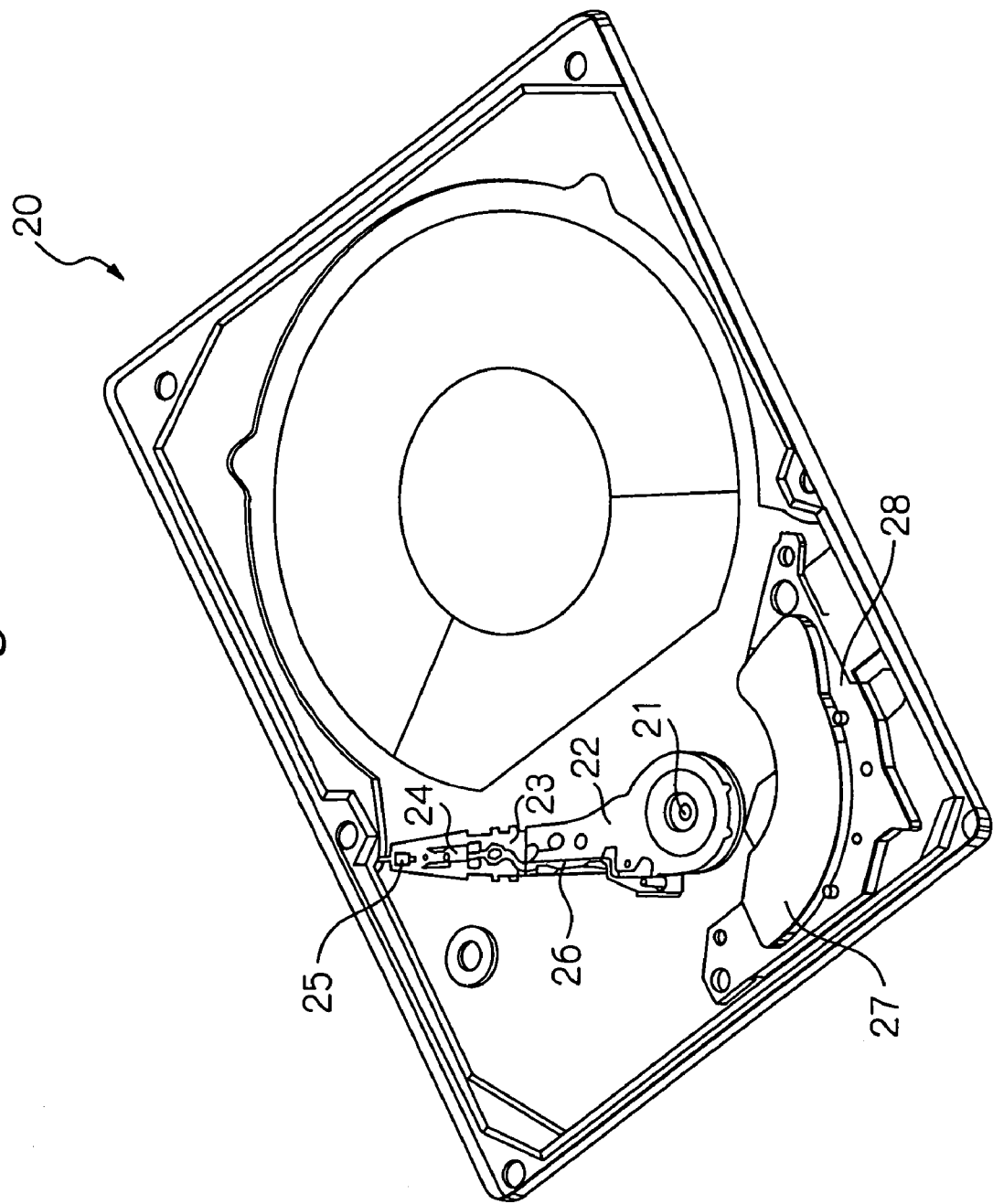
FIG. 4 shows an oblique view schematically illustrating configuration of a first cover member side of the HDD apparatus in this embodiment.
Figure 5A:
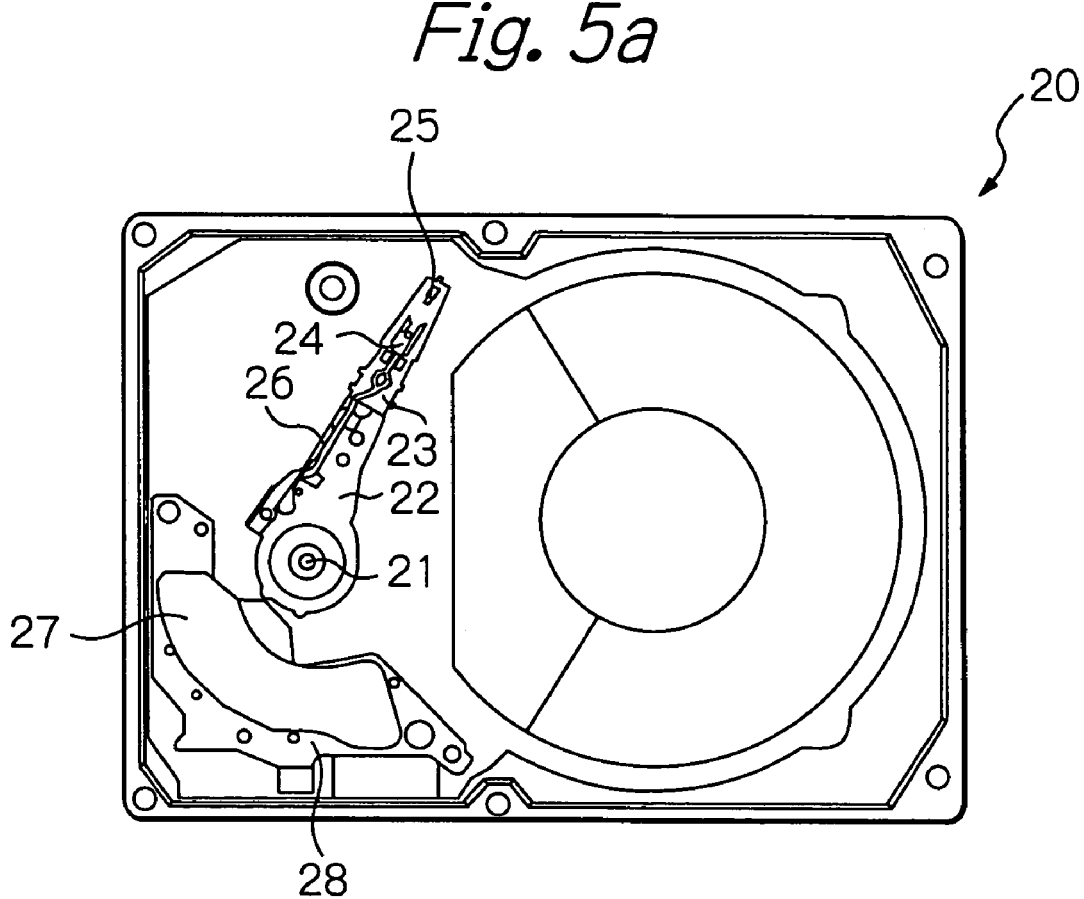
FIGS. 5a and 5b show a plane view and a rear view of the first cover member of FIG. 4.
Figure 5B:
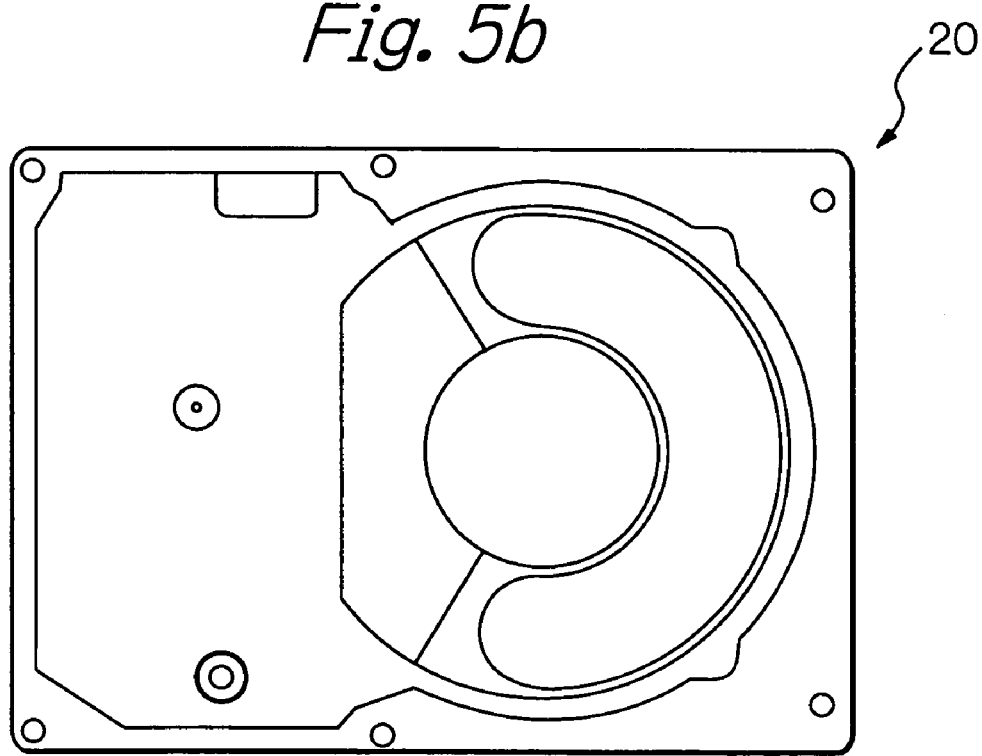
Figure 6:
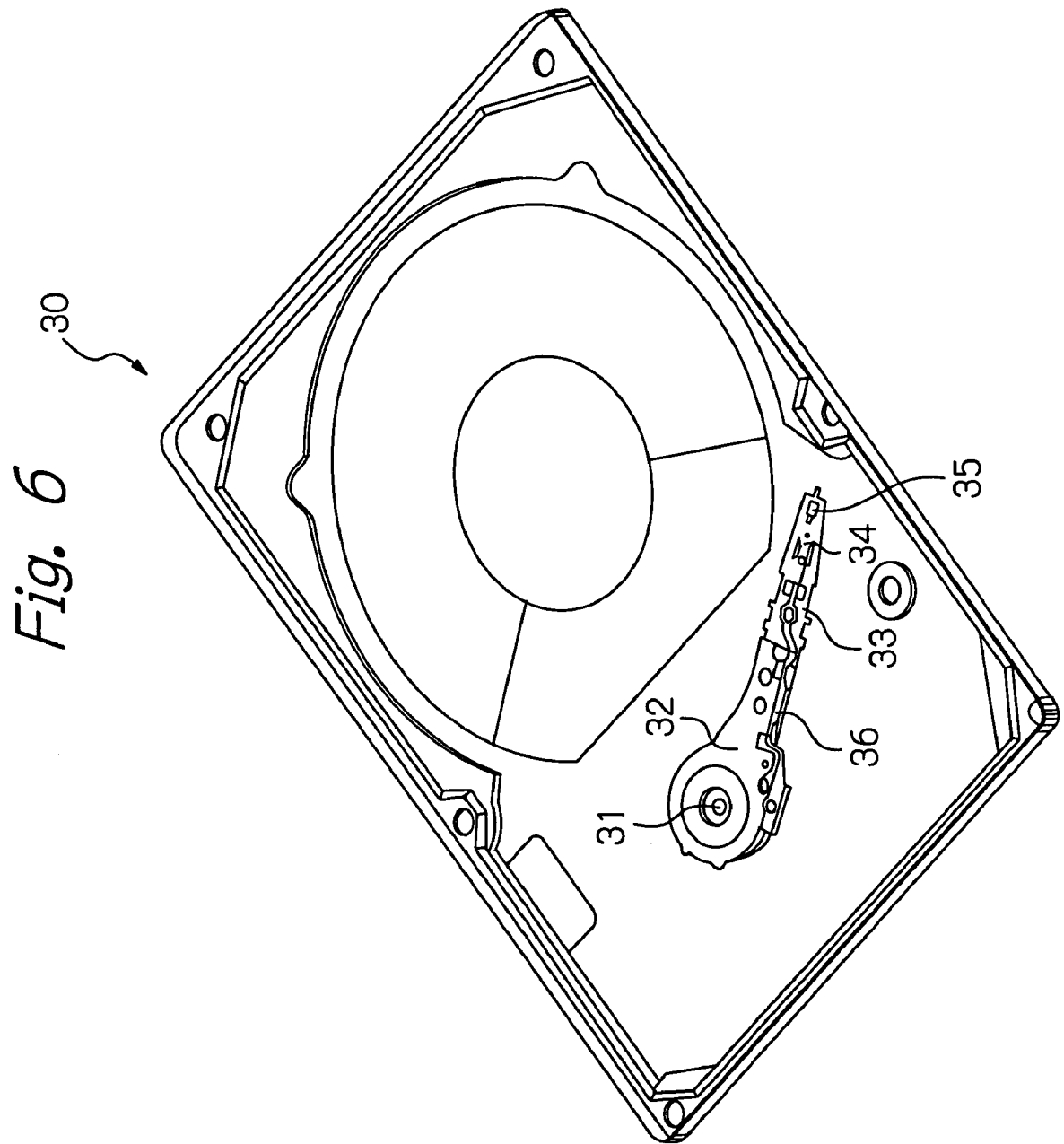
FIG. 6 shows an oblique view schematically illustrating configuration of a second cover member side of the HDD apparatus in this embodiment.
Figure 7A:
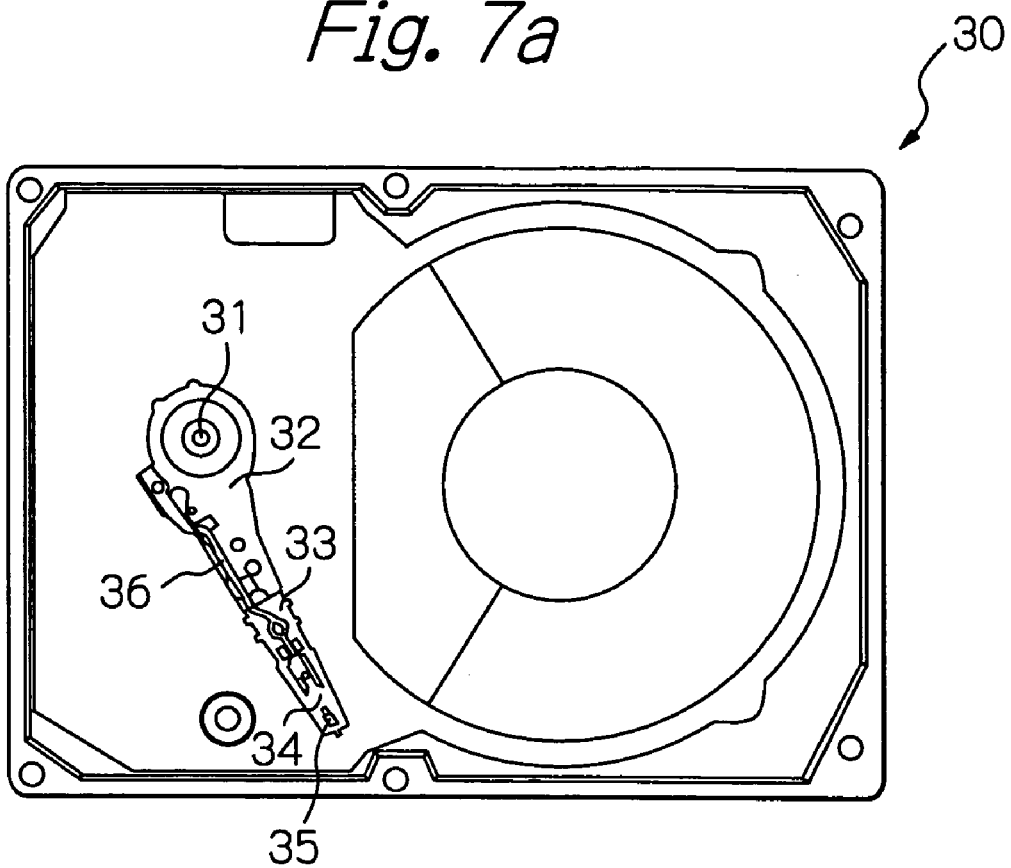
FIGS. 7a and 7b show a plane view and a rear view of the second cover member of FIG. 6.
Figure 7B:
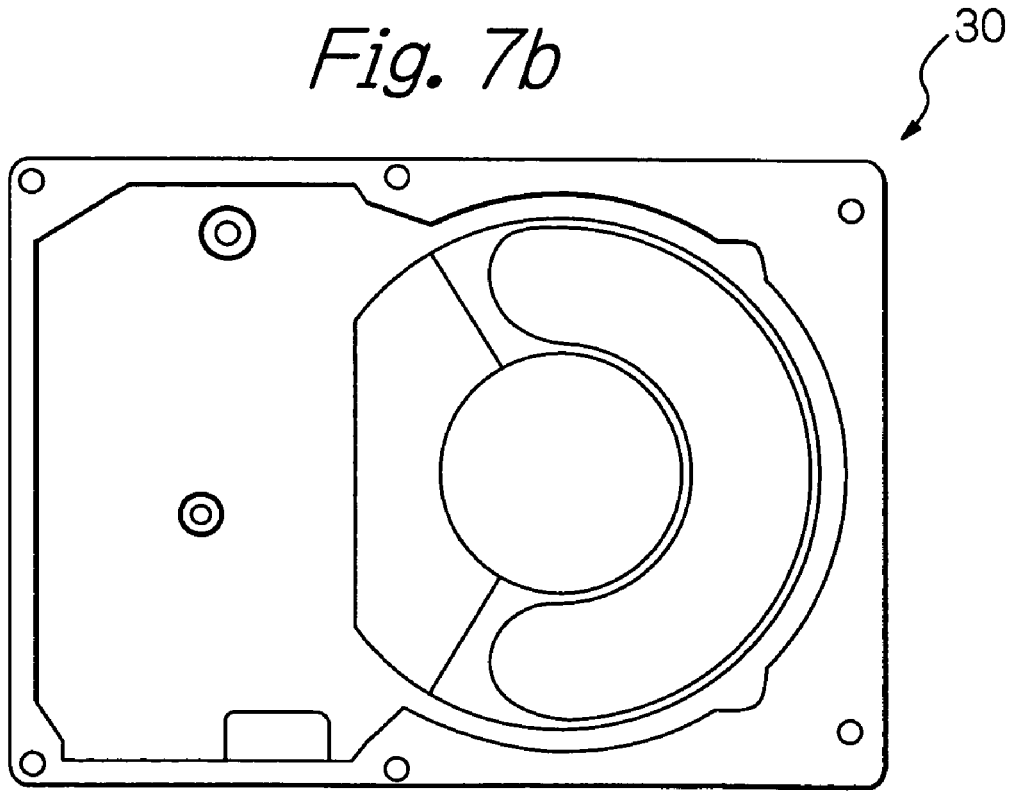

FIG. 1 schematically illustrates appearance of an HDD apparatus as a preferred embodiment according to the present invention, FIGS. 2, 3a and 3b schematically illustrate configuration of a housing member of the HDD apparatus in this embodiment, FIGS. 4, 5a and 5b schematically illustrate configuration of a first cover member side of the HDD apparatus in this embodiment, and FIGS. 6, 7a and 7b schematically illustrate configuration of a second cover member side of the HDD apparatus in this embodiment.

As shown in FIG. 1, the HDD apparatus in this embodiment consists of the housing member 10, the first cover member 20 detachably fixed to the housing member 10 to cover its one face, and the second cover member 30 detachably fixed to the housing member 10 to cover its other face.

As shown in FIGS. 2, 3a and 3b, the housing member 10 has the one face 10a substantially fully opened and the other face 10b partially opened. The one opened face 10a is a front face shown in FIG. 3a and the other opened face 10b is a rear face shown in FIG. 3b. To the housing member 10, a single magnetic disk 11 is rotatably mounted, and also a spindle motor (only its rotation axis 12 is shown in the figure) for rotating the magnetic disk 11 is attached. To the housing member 10, furthermore, a horizontal rotation axis 13, an arm support member 14 rotationally movable around the axis 13 for supporting a base section of a support arm, a coil section 15 of a VCM for rotationally driving the arm support member 14, a part 16 of a yoke section of the VCM, external connection terminals 17, connection pads 18 formed on the arm support member 14 to be electrically connected to first and second wiring members of the first and second cover members 20 and 30, and a third wiring member 19 (its parties shown in FIG. 10) consisting of for example a flexible print circuit (FPC) formed by a base resin layer, conductors laminated on the base resin layer and a coating resin layer are attached. On end of the third wiring member 19 is electrically connected to the external connection terminals 17, and the other ends of the wiring member 19 are electrically connected to the spindle motor, to the coil section 15 of the VCM and the connection pads 18.

As shown in FIGS. 4, 5a and 5b, to the first cover member 20, a horizontal rotation axis 21 and a first support arm 22 made of an extremely high stiffness member are attached. The first support arm 22 is mounted to the horizontal rotation axis 21 so as to rotationally move around this axis. To the first cover member 20, also, a first load beam 23 made of a high stiffness member or configured to have high stiffness, a resilient first flexure 24, a first magnetic head slider 25 provided with a thin-film magnetic head element consisting of a write head element and an MR read head element such as a GMR head element or a TMR head element, a first wiring member 26 consisting of a FPC with an IC chip, a magnet section 27 of the VCM, and the remaining part 28 of the yoke section of the VCM are attached. The first load beam 23 is fixed to the first support arm 22 at its top end section, the first flexure 24 is fixed to the first load beam 23, and the first magnetic head slider 25 is mounted on the first flexure 24.

As shown in FIGS. 6, 7a and 7b, to the second cover member 30, a horizontal rotation axis 31 and a second support arm 32 made of an extremely high stiffness member are attached. The second support arm 32 is mounted to the horizontal rotation axis 31 so as to rotationally move around this axis. To the second cover member 30, also, a second load beam 33 made of a high stiffness member or configured to have high stiffness, a resilient second flexure 34, a second magnetic head slider 35 provided with a thin-film magnetic head element consisting of a write head element and an MR read head element such as a GMR head element or a TMR head element, and a second wiring member 36 consisting of a FPC are attached. The second load beam 33 is fixed to the second support arm 32 at its top end section, the second flexure 34 is fixed to the second load beam 33, and the second magnetic head slider 35 is mounted on the second flexure 34.

The first and second flexures 24 and 34 in this embodiment are made of a resilient metal plate and have flexible tongues (not shown) at their top end sections, respectively. These tongues flexibly support the respective magnetic head sliders 25 and 35 to provide stability in the flying attitude of the sliders. On the first and second flexures 24 and 25, the first and second wiring members each including a plurality of trace conductors for passing a sense current and a write current to the thin-film magnetic head and signals from the thin-film magnetic head are formed, respectively. To the trace conductors, the aforementioned IC chip is electrically connected. Each wiring member may be configured by directly depositing layers on the surface of the flexure or by adhering a separately formed FPC on the surface of the flexure.

First and second suspensions are configured by assembling the first load beam 23 and the first flexure 24, and the second load beam 33 and the second flexure 34, respectively. First and second HGAs are configured by assembling the first and second suspensions, the first and second magnetic head sliders 25 and 35, and the first and second wiring members 26 and 36, respectively.

Figure 8:
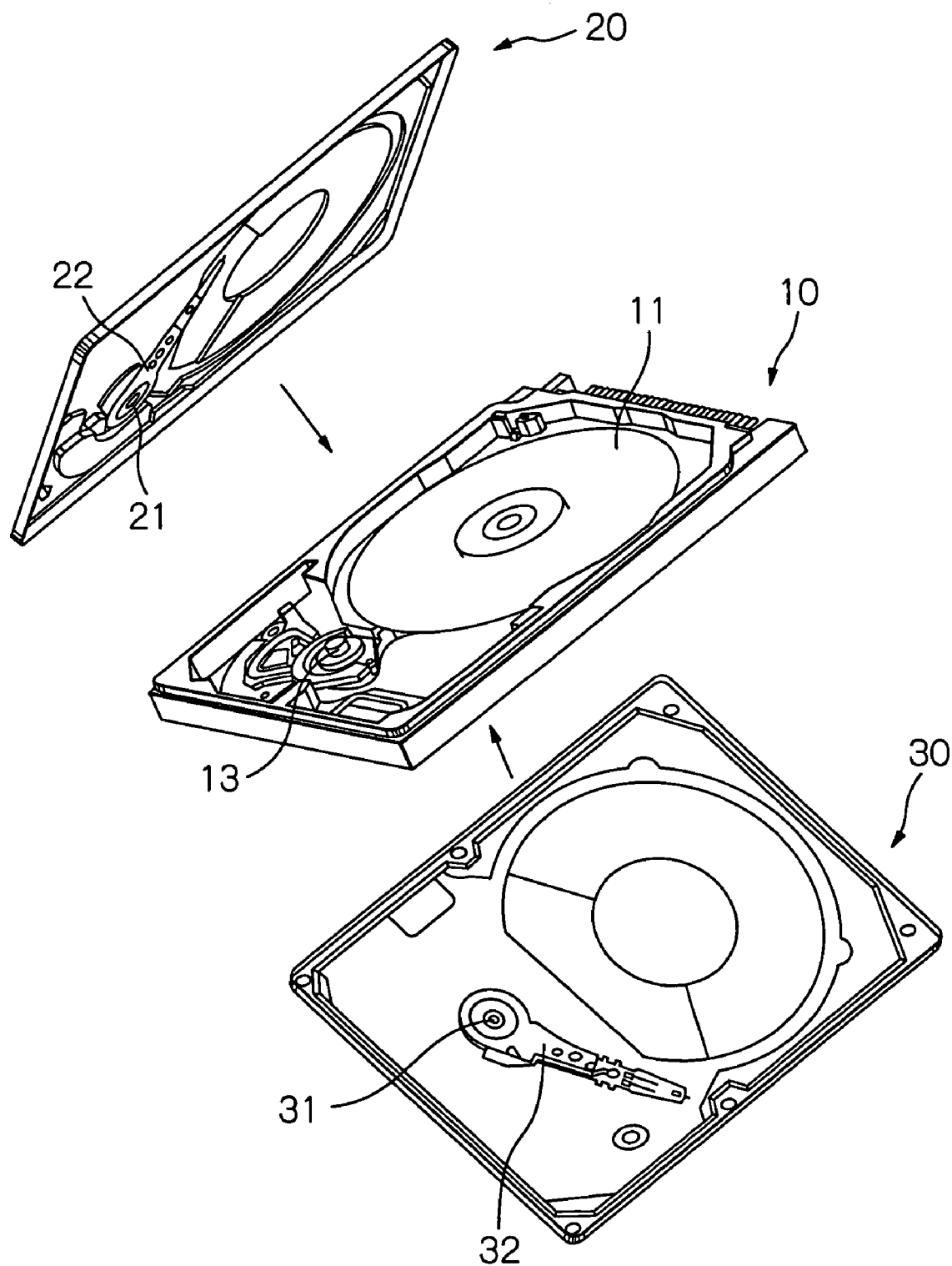
FIG. 8 shows an exploded oblique view illustrating assembling of the HDD apparatus by attaching the cover members to the housing member in this embodiment.

FIG. 8 illustrates assembling of the HDD apparatus by attaching the first and second cover members 20 and 30 to the housing member 10 in this embodiment.

As shown in the figure, the magnetic disk 11, the spindle motor, the horizontal rotation axis 13, the arm support member 14, the coil section 15 of the VCM, the part 16 of the yoke section of the VCM, the external connection terminals 17 and the third wiring member 19 are preliminarily attached to the housing member 10. On the other hand, the horizontal rotation axis 21, the first support arm 22, the first wiring member 26, the magnet section 27 of the VCM and the remaining part 28 of the yoke section of the VCM are preliminarily attached to the first cover member 20. Furthermore, the horizontal rotation axis 31, the second support arm 32 and the second wiring member 36 are preliminarily attached to the second cover member 30. Then, the first cover member 20 is fixed to the housing member 10 to cover and seal the opening of the front face 10a of this housing member 10, and the second cover member 30 is fixed to the housing member 10 to cover and seal the opening of the rear face 10b of this housing member 10, so as to provide the HDD apparatus.

According to the embodiment, the first and second support arms 21 and 31 with the respective first and second HGAs having the magnetic head sliders 25 and 35 and the first and second suspensions are attached to the first and second cover members 20 and 30, respectively, whereas the magnetic disk 11 and the spindle motor are attached to the housing member 10. Therefore, it is possible to assemble each HGA in isolation from the housing member 10 provided with the magnetic disk 11 of which surface has to keep clean, resulting that flexibility of tools or devices used for assembling each HGA can be increased and also assembling itself can be performed with a high degree of efficiency. Furthermore, when replacing each HGA already assembled in the HDD apparatus, the replacement work can be performed by detaching only the first cover member 20 and/or the second cover member 30 from the HDD apparatus, namely by treating only the first cover member 20 and/or the second cover member 30 in isolation from the housing member 10, no contamination of the disk surface can be induced and also the replacement can be effectively executed.

During this assembling, the first support arm 22 of the first cover member 20 and the second support arm 32 of the second cover member 30 are fixed to the arm support member 14 of the housing member 10 so that the horizontal rotation axis 21 of the first cover member 20 and the horizontal rotation axis 31 of the second cover member 30 are coaxial with the horizontal rotation axis 13 of the housing member 10. Thus, both the first support arm 22 and the second support arm 32 are driven by the VCM to simultaneously and coaxially rotate around the horizontal rotation axis 13. Also, connection pads of the first and second cover members 20 and 30 are brought into pressure contact with the connection pads 18 of the housing member 10 so that the third wiring member 19 of the housing member is electrically connected to first and second wiring members 26 and 36 of the first and second cover members 20 and 30. Hereinafter, this structure will be described in detail.

Figure 9:
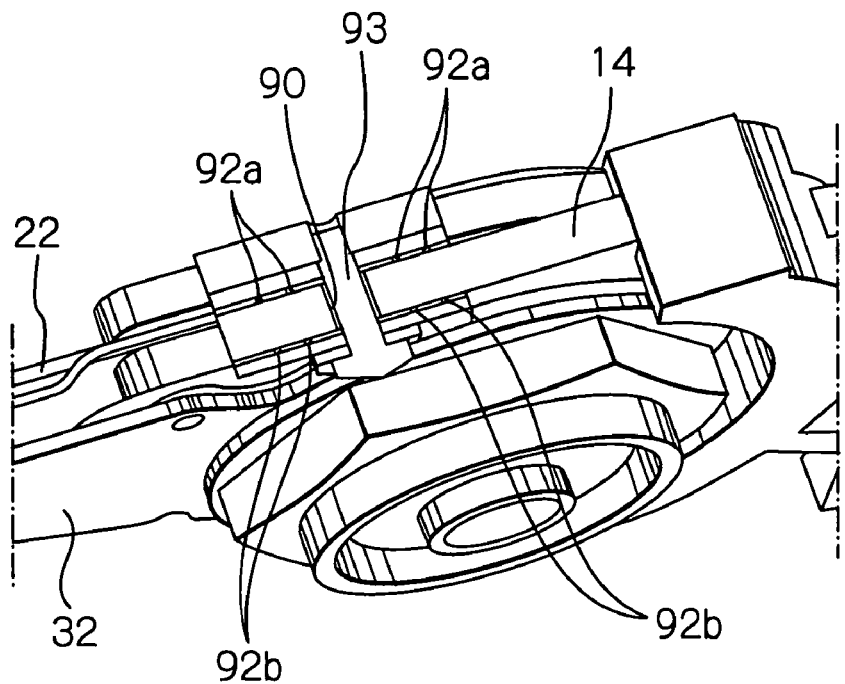
FIG. 9 shows an oblique sectional view illustrating an enlarged connection section in this embodiment.
Figure 10:
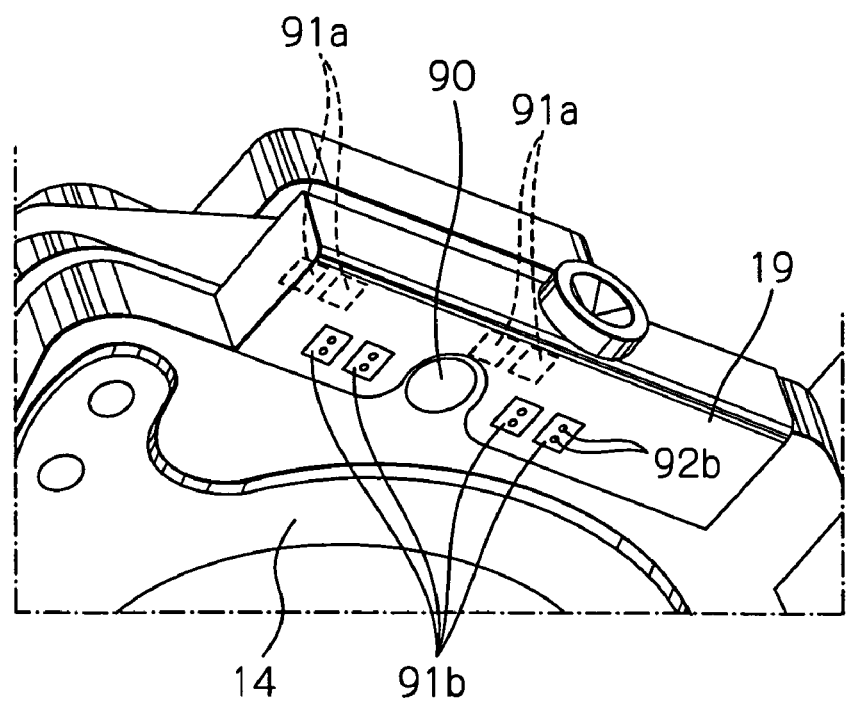
FIG. 10 shows an oblique view illustrating the enlarged connection section in this embodiment.

FIGS. 9 and 10 illustrate the enlarged connection section in this embodiment.

As shown in these figures, a part of the third wiring member 19 made of FPC is formed or adhered on the arm support member 14 of the housing member 10, and four connection pads for each of up and down faces and thus totally eight connection pads 91a and 91b (18) are formed on the wiring member 19 near a via hole 90 that penetrates through the arm support member 14.

Two gold balls 92a are fixed on each of the connection pads 91a and two gold balls 92b are fixed on each of the connection pads 91b. On the other hand, connection pads (not shown) electrically connected to one ends of the first and second wiring members 26 and 36 are formed at the corresponding positions on the support arms 22 and 32 of the first and second cover members 20 and 30, respectively.

When the first and second cover members 20 and 30 are disposed on the housing member 10 to fix thereto by using a plurality of screws (not shown), the bolt 93 is inserted into the via hole 90, and then a nut (not shown) is screwed with the bolt 93 as shown in FIG. 9. Thus, the gold balls 92a of the connection pads 91a are brought into pressure contact with the respective connection pads of the first cover member 20 to make electrical conductions there between, and the gold balls 92b of the connection pads 91b are brought into pressure contact with the respective connection pads of the second cover member 30 to make electrical conductions there between.

Therefore, the electrical connection between the first, second and third wiring members can be easily performed by abutting the gold balls 92a of the connection pads 91a of the housing member 10 to the respective connection pads of the first cover member 20, by abutting the gold balls 92b of the connection pads 91b of the housing member 10 to the respective connection pads of the second cover member 30, and by clamping them using the bolt 93 and the nut. Also, the electrical disconnection between the first, second and third wiring members can be easily performed unscrewing the bolt 93 and the nut to separate them. Namely, when attaching and detaching the first and second cover members 20 and 30 to and from the housing member 10, electrical wiring can be easily connected and disconnected.

Figure 11:
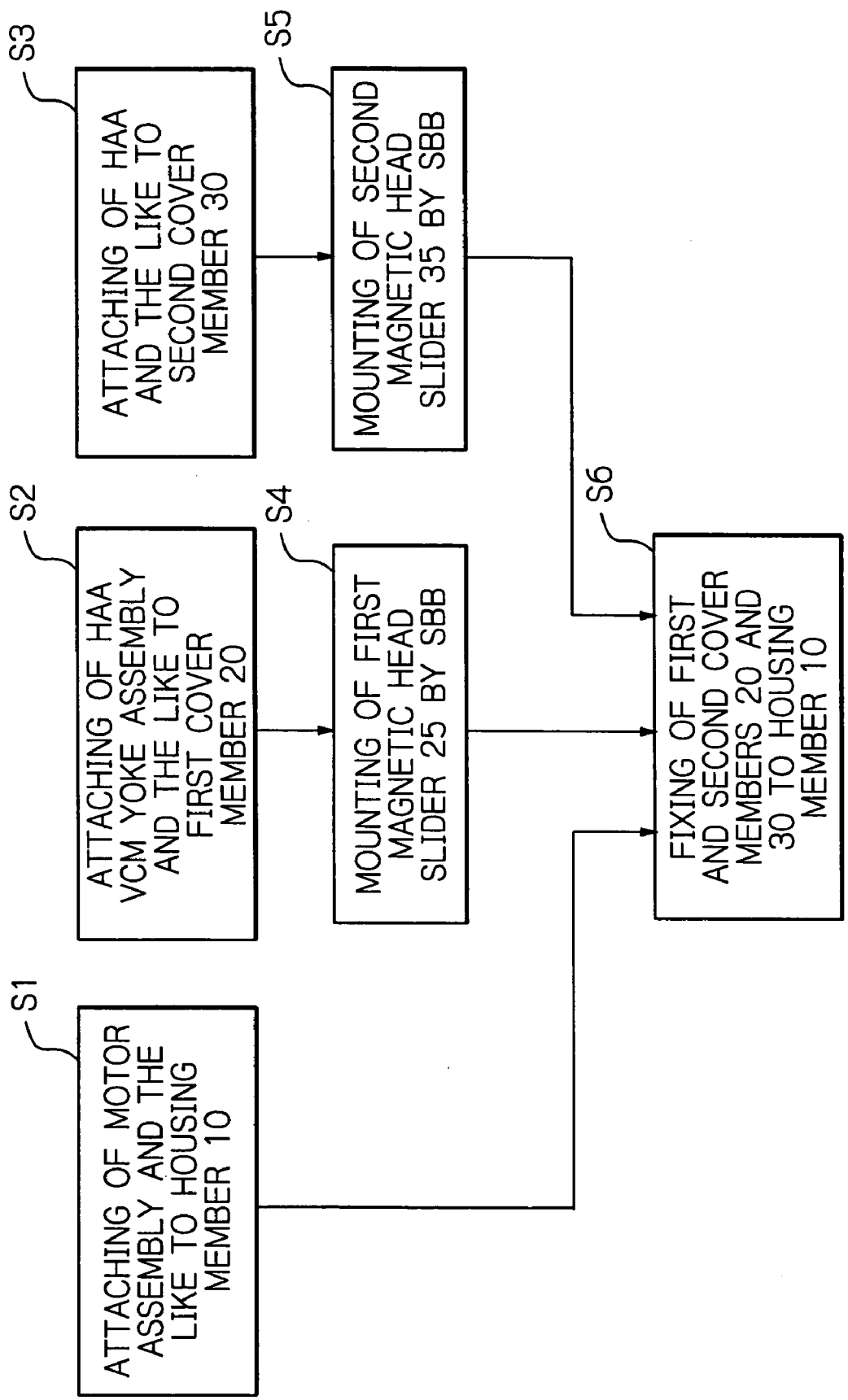
FIG. 11 shows a flow chart illustrating the assembling process of the HDD apparatus in this embodiment.

FIG. 11 illustrates flow of the assembling process of the HDD apparatus in this embodiment.

First, to the housing member 10, a motor assembly consisting of the spindle motor, the magnetic disk 11 and the like, the horizontal rotation axis 13 and the arm support member 14, the coil section 15 and the part 16 of the yoke section of the VCM, and other necessary components are preliminarily attached (Step S1).

On the other hand, to the first cover member 20, a first head arm assembly (HAA) consisting of the first support arm 22 to which the first HGA except for the first magnetic head slider 25 is mounted, the horizontal rotation axis 21 and the like, a VCM-yoke assembly consisting of the magnet section 27 of the VCM and the remaining part 28 of the yoke section of the VCM, and other necessary components are preliminarily attached (Step S2).

Also, to the second cover member 30, a second HAA consisting of the second support arm 32 to which the second HGA except for the second magnetic head slider 35 is mounted, the horizontal rotation axis 21 and the like, and other necessary components are preliminarily attached (Step S3).

Figure 12:
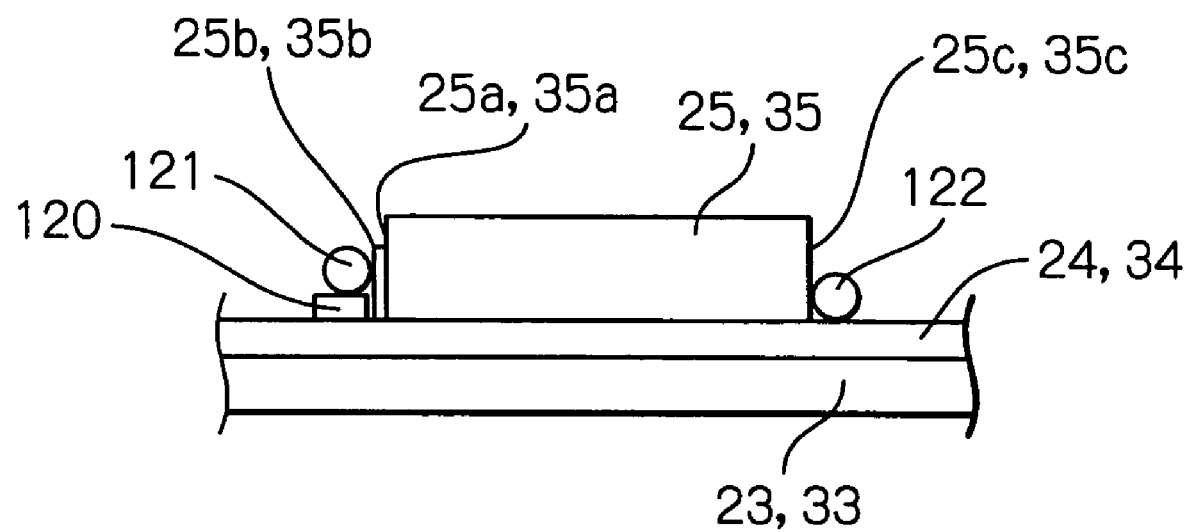
FIG. 12 shows a sectional view illustrating the structure for mounting the magnetic head slider in this embodiment.

Just before the first cover member 20 is fixed to the housing member 10 after all the necessary components are attached to this cover member 20, the first magnetic head slider 25 is mounted on the first flexure 24 of the first HGA (Step S4). Similarly to this, just before the second cover member 30 is fixed to the housing member 10 after all the necessary components are attached to this cover member 30, the second magnetic head slider 35 is mounted on the second flexure 34 of the second HGA (Step S5). The mounting of the first and second magnetic head sliders 25 and 35 on the respective flexures 24 and 34 is performed by SBB. That is, as shown in FIG. 12, electrical connections of terminal electrodes 25b (35b) formed on a element formed surface or trailing surface 25a (35a) of the magnetic head slider 25 (35) with connection pads 120 that are a part of the wiring member are performed by SBB using solder balls 121, and also mechanical fixing of the magnetic head slider 25 (35) to the suspension is performed by SBB using solder balls 122 disposed between the trailing surface 25a (35a) and/or the surface 25c (35c) deferent from the trailing surface 25a (35a) of the magnetic head slider 25 (35) and the flexure 24 (34).

Because SBB is used for both the electrical connection and the mechanical connection of the sliders 25 and 35, no clamping tool utilized in the ultrasonic GBB process is necessary to use. Therefore, it is possible to mount the magnetic head sliders 25 and 35 even after the assembling of the HGAs. Also, because the mechanical fixings of the magnetic head sliders 25 and 35 to the respective suspensions are performed by SBB, the resin-feeding process and the resin-curing process that are necessary when resin adhesive is used for fixing can be omitted resulting the manufacturing process to simplify. Furthermore, if it is necessary to detach the magnetic head sliders 25 and 35 from the respective HGAs, since the mechanical fixings are executed by SBB, the sliders 25 and 35 and the flexures 24 and 34 can be extremely easily separated from each other by heating the solder balls and by sucking and removing thus molten solder in a vacuum.

Thereafter, the first and second cover members 20 and 30 are fixed to the housing member 10 to close the opened faces of the housing member 10 to finish the HDD apparatus (Step S6).

As aforementioned, HGAs with no magnetic head slider that is easily destructed by ESD are first attached to the respective cover members 20 and 30, and then the magnetic head sliders 25 and 35 are mounted on the respective HGAs just before these cover members 20 and 30 are fixed to the housing member 10. Therefore, according to this embodiment, ESD destruction of the magnetic head sliders 25 and 35 can be effectively suppressed.

In the above-mentioned embodiment, the coil section of the VCM, a part of the yoke section of the VCM and the arm support member are attached to the housing member 10. However, in a modification, these components may be attached to the first cover member or to the second cover member. Also, in the above-mentioned embodiment, the VCM-yoke assembly is attached to the first cover member. However, in modification, this assembly may be attached to the second cover member or to the housing member.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus comprising:
    a housing member with first and second faces opposed to each other, at least part of each of said first and second faces being opened;
    a first cover member configured to cover said first face of said housing member;
    a second cover member configured to cover said second face of said housing member;
    a first head gimbal assembly including a first magnetic head slider and a first suspension configured to support said first magnetic head slider;
    a second head gimbal assembly including a second magnetic head slider and a second suspension configured to support said second magnetic head slider;
    a first support arm configured to support said first head gimbal assembly;
    a second support arm configured to support said second head gimbal assembly;
    a magnetic disk with both surfaces to which said first and second magnetic head sliders are opposed, respectively; and
    a motor configured to rotate said magnetic disk,
    wherein said magnetic disk and said motor are attached to said housing member, said first support arm is attached to said first cover member, and said second support arm is attached to said second cover member; and
    said housing member includes a plurality of electrical connectors configured to form a pressure contact electrical connection with each of said first support arm and said second support arm.

2. The apparatus as claimed in claim 1, wherein said apparatus further comprises:
    an actuator configured to rotatively move said first and second support arms in parallel with the surfaces of said magnetic disk, a part of said actuator being attached to said housing member.

3. The apparatus as claimed in claim 2, wherein the remaining part of said actuator is attached to one of said first and second cover members.

4. The apparatus as claimed in claim 1, wherein said first head gimbal assembly further includes a first wiring member supported by or formed on said first suspension, and electrically connected with said first magnetic head slider.

5. The apparatus as claimed in claim 4, wherein said first magnetic head slider is electrically connected with said first wiring member by solder ball bonding.

6. The apparatus as claimed in claim 1, wherein said second head gimbal assembly further includes a second wiring member supported by or formed on said second suspension, and electrically connected with said second magnetic head slider.

7. The apparatus as claimed in claim 6, wherein said second magnetic head slider is electrically connected with said second wiring member by solder ball bonding.

8. The apparatus as claimed in claim 1, wherein said first and second magnetic head sliders are fixed to said first and second suspensions by solder ball bonding, respectively.

9. The apparatus as claimed in claim 8, wherein said first magnetic head slider is fixed to said first suspension by solder ball bonding at an element formed surface and/or at least one surface other than said element formed surface of said first magnetic head slider, and wherein said second magnetic head slider is fixed to said second suspension by solder ball bonding at an element formed surface and/or at least one surface other than said element formed surface of said second magnetic head slider.

* * * * *